United States Patent [19]

Nakajima et al.

[11] Patent Number: 4,912,567
[45] Date of Patent: Mar. 27, 1990

[54] IMAGE READER

[75] Inventors: Akio Nakajima; Masamichi Kishi, both of Osaka, Japan

[73] Assignee: Minolta Camera Kabushiki Kaisha, Osaka, Japan

[21] Appl. No.: 288,271

[22] Filed: Dec. 22, 1988

[30] Foreign Application Priority Data

Dec. 25, 1987 [JP] Japan .................................. 62-333392
Dec. 25, 1987 [JP] Japan .................................. 62-333393
Dec. 25, 1987 [JP] Japan .................................. 62-333394

[51] Int. Cl.⁴ ........................................... H04N 1/393
[52] U.S. Cl. .................................... 358/451; 358/227; 358/475
[58] Field of Search ...................... 358/227, 451, 475; 250/201, 578

[56] References Cited

U.S. PATENT DOCUMENTS

| | | | |
|---|---|---|---|
| 4,464,681 | 8/1984 | Jacobs et al. | 358/285 |
| 4,614,977 | 9/1986 | Kawahara et al. | 358/451 |
| 4,660,094 | 4/1987 | Yoshimoto et al. | 358/227 |
| 4,687,944 | 8/1987 | Mitsuka et al. | 35//451 |
| 4,751,376 | 6/1988 | Sugiura et al. | 250/201 |

Primary Examiner—Edward L. Coles, Sr.
Attorney, Agent, or Firm—Willian Brinks Olds Hofer Gilson & Lione

[57] ABSTRACT

An image reader comprising a variable magnification system for moving a lens disposed between an image of a document and an image sensor is disclosed. The focus adjustment is performed by moving the image sensor in a direction parallel to an optical axis of the lens. An initializing processing is finished without the focus adjustment in case the image formed on the image sensor is in the infocus condition when the power is supplied to the image reader and the magnification is the equal last magnification.

10 Claims, 15 Drawing Sheets

IMAGE READER

BACKGROUND OF THE INVENTION

1. Field of the Invention

The present invention relates to an image reader comprising an optical system for varying the magnification of an image.

2. Description of Prior Art

In a conventional image reader comprising an optical system for varying the magnification of an image, a lens is disposed on the optical path between a document and an image sensor, and the image reduced by the lens is formed on the image sensor. The magnification of reading the image can be changed optically by moving the position of the lens. When the magnification is changed, the lens and the image sensor are moved to a position where the image formed on the image sensor is focused. The moving amounts of the lens and the image sensor can be calculated according to predetermined equations. The lens and the image sensor are moved by pulse motors, respectively.

Upon reading the image, the optical system comprising the lens and the image sensor must be adjusted to be in the infocus condition. Therefore, when the power is supplied to the image reader, the optical system must be adjusted to be in the infocus condition by changing the distance between the lens and the image sensor.

Furthermore, on the focus adjustment, the focus adjustment may not be performed depending on the initial position of the optical system. For example, when the optical system is positioned at a stopper, the optical system can not be moved and the distance between the lens and the image sensor can not be changed even though a motor for the focus adjustment is rotated. Normally, an illumination lamp provided for the focus adjustment is turned on for a relatively short time. However, when the focus adjustment can not be performed as described above, the illumination lamp may continue to be turned on, resulting in that there is a problem of safety such as increase of temperature of the image reader.

SUMMARY OF THE INVENTION

An object of the present invention is to provide an image reader which is able to omit the focus adjustment when the optical system is in the infocus condition.

Another object of the present invention is to provide an image reader which is able to stop the focus adjustment when the focus adjustment is performed in an abnormal condition.

A further object of the present invention is to provide an image reader which is able to perform the focus adjustment with high reliability.

According to one aspect of the present invention, there is provided an image reader comprising: an image sensor for reading an image of a document through a lens; a variable magnification means for moving said lens so as to vary a magnification of the image formed on said image sensor; a focus adjusting means for moving said image sensor in a direction parallel to an optical axis of said lens; a pattern plate disposed in the vicinity of a reading area of the document, said pattern plate having a predetermined pattern comprised of plural images; a magnification measuring means for measuring the magnification of the image formed on said image sensor in accordance with the interval between the images of said pattern plate being read by said image sensor and for storing the measured magnification; a focus judging means for judging the infocus condition of the image formed on said image sensor in accordance with the images of said pattern plate being read by said image sensor; and an initializing means for finishing an initializing processing without making said focus judging means operate in case said focus adjusting means judges that the image formed on said image sensor is in the infocus condition when the power is supplied to said image reader and the last magnification stored by said magnification measuring means is the equal magnification.

Accordingly, since the initializing processing is finished in case the image is in the infocus condition when the power is supplied and the magnification is the equal magnification, the focus adjustment can be omitted and the preparing time for the operation of the image reader can be reduced.

According to another aspect of the present invention, there is provided an image reader comprising: an image sensor for reading an image of a document through a lens; a variable magnification means for moving said lens so as to vary a magnification of the image formed on said image sensor; a focus adjusting means for moving said image sensor in a direction parallel to an optical axis of said lens; a pattern plate disposed in the vicinity of a reading area of the document, said pattern plate having a predetermined pattern comprised of plural images; a focus judging means for judging the infocus condition of the image formed on said image sensor in accordance with the images of said pattern plate being read by said image sensor; an error judging means for outputting an error signal when said focus judging means does not judge that the image formed on said image sensor is in the infocus condition a predetermined time after said focus adjusting means begins to operate or after said image sensor is moved by a distance larger than a predetermined distance; and a control means for stopping the operation of said focus adjusting means in accordance with the error signal.

According to a further aspect of the present invention, there is provided an image reader comprising: an image sensor for reading an image of a document through a lens; a variable magnification means for moving said lens so as to vary a magnification of the image formed on said image sensor; a focus adjusting means for moving said image sensor in a direction parallel to an optical axis of said lens; a pattern plate disposed in the vicinity of a reading area of the document, said pattern plate having a predetermined pattern comprised of plural images; a focus judging means for judging the infocus condition of the image formed on said image sensor in accordance with the images of said pattern plate being read by said image sensor; an undesirable state judging means for outputting an undesirable state signal when said focus judging means does not judge that the image formed on said image sensor is in the infocus condition a predetermined time said focus adjusting means begins to operate or after said image sensor is moved by a distance larger than a predetermined distance; a retry means for reversing the moving direction of said image sensor and making said focus adjustment operate again; and an error judging means for outputting an error signal when the operation number of times of said retry means is larger than a predetermined value.

The focus adjustment is finished when the image is not in the infocus condition a predetermined time after the focus adjustment is started or after the image sensor is moved by a distance larger than a predetermined distance, resulting in that the time for the abnormal condition of the focus adjustment can be reduced and the safety of the image reader can be improved.

BRIEF DESCRIPTION OF THE DRAWINGS

The present invention may be better understood and its numerous objects and advantages will become apparent to those skilled in the art by reference to the accompanying drawings as follows.

DETAILED DESCRIPTION OF THE PREFERRED EMBODIMENT

Figure 1:
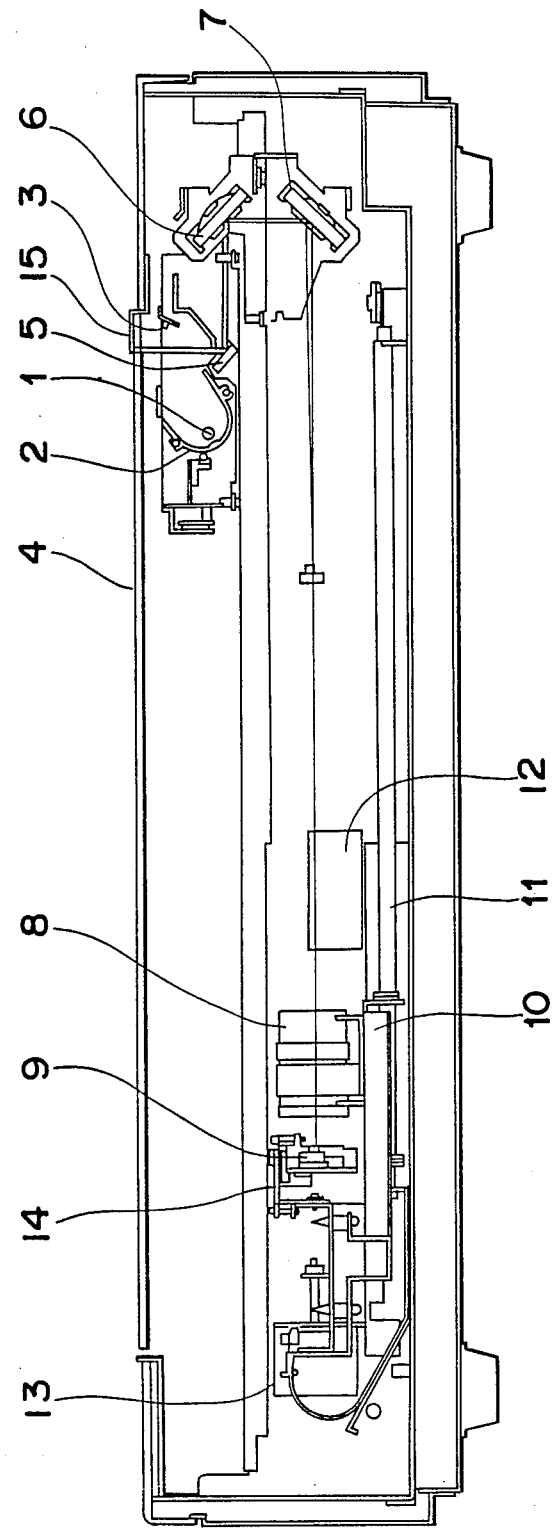
FIG. 1 is a sectional view of an optical system of an image reader according to the preferred embodiment of the present invention.

An image reader according to the preferred embodiment of the present invention will be described in the following order, referring to the attached drawings:

(a) Optical system for the image reader,
(b) Circuit system for the image reader,
(c) Operation for the focus adjustment,
(d) Operation on the undesirable state for the focus adjustment, and
(e) Operation of the image reading (a) Optical system for the image reader FIG. 1 is a sectional view of the image reader comprising an optical variable magnification system showing a fundamental process of the image reading.

In FIG. 1, the light emitted from an illumination lamp 1 is in the infocus condition onto a reading position on a glass plate 4 for positioning a document by reflecting mirrors 2 and 3, the reflected light of the document is reflected by mirrors 5, 6 and 7, and the image thereof is formed through a lens 8 on a Charge Coupled Device image sensor (which is referred to hereinafter as "CCD image sensor") 9. Upon reading the image, the first optical system comprising the illumination lamp 1 and the mirror 5 and the second optical system comprising the mirrors 6 and 7 are respectively moved at a speed ratio of 2 to 1 in a subscan direction (in the left direction of FIG. 1) so as to make the distance $l_a$ between the reading position and the lens 8 constant and maintain the image forming condition. The image formed on the CCD image sensor 9 is converted by the CCD image sensor 9 to an electric image signal, and the image signal is transferred to an image processing circuit described blow in detail, and then, the reading of the image is completed.

In the aforementioned optical system, the distance $l_a$ between the reading position and the lens 8 is adjusted by moving a carriage 10 on which the lens 8 is mounted along a guide shaft 11 with use of a lens motor 12, and the distance $l_b$ between the lens 8 and the CCD image sensor 9 is adjusted by moving a CCD holder 14 on which the CCD image sensor 9 is mounted relative to the carriage 10 in a direction parallel to an optical axis of the lens 8 with use of a focusing motor 13 mounted on the carriage 10.

(b) Circuit system for the image reader

Figure 2:
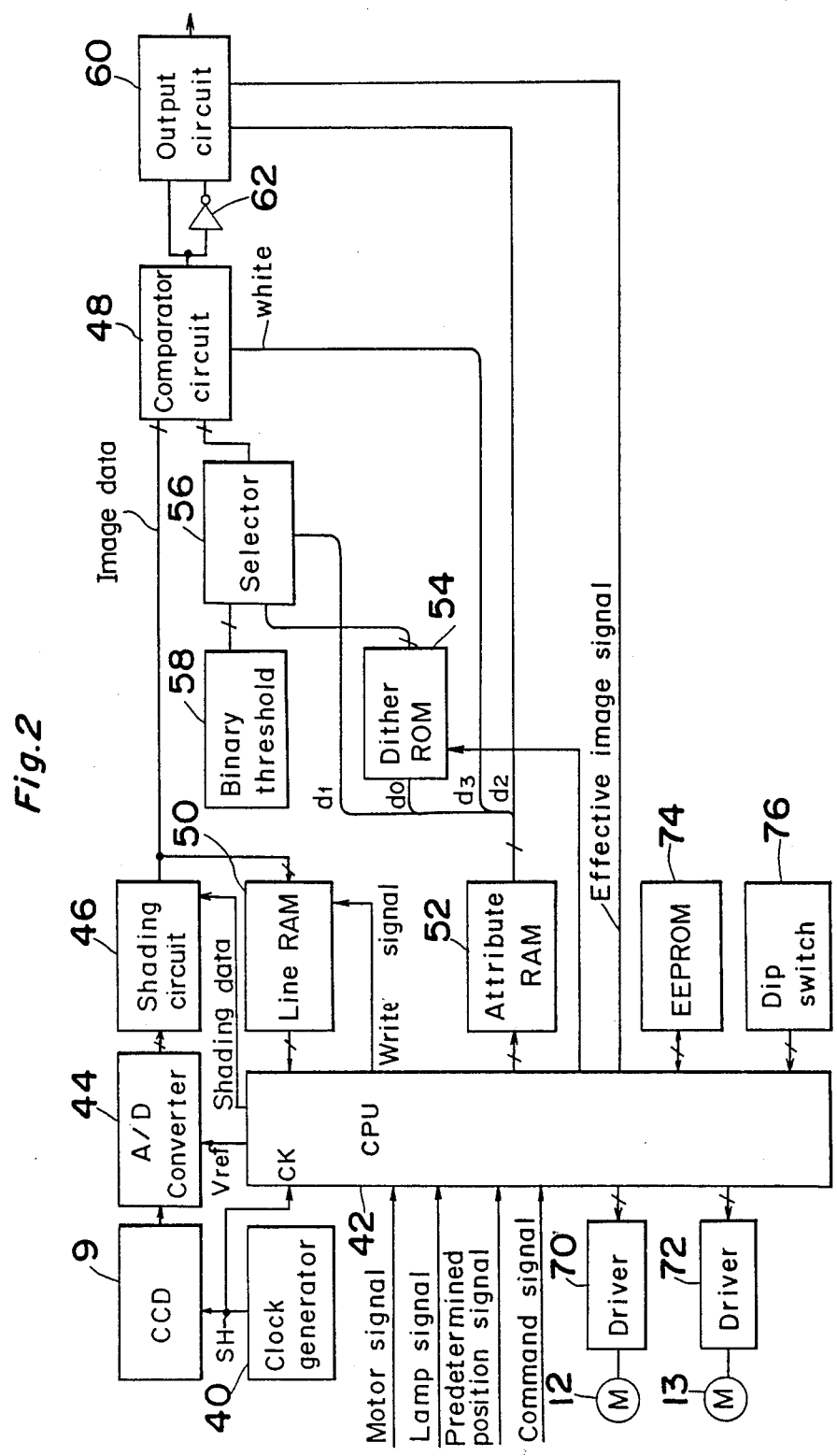
FIG. 2 is a schematic diagram of a circuit system of the image reader shown in FIG. 1.

FIG. 2 is a schematic diagram of the circuit system of the image reader.

In FIG. 2, a clock generator 40 outputs a sample and hold signal SH to the CCD image sensor 9 and a CPU 42 as a clock signal. The CCD image sensor 9 converts a light image into an analog electric signal. An analog/-digital converter 44 converts the analog electric signal outputted from the CCD image sensor 9 into a digital signal. A shading circuit 46 corrects the nonuniformity of the light amount in the main scan direction and also corrects the level of the image signals respectively outputted from each of the picture elements of the CCD image sensor 9, and an operation timing of the shading circuit 46 is given by the CPU 42. The image data outputted from the shading circuit 46 is input into a comparator circuit 48 and a line random access memory 50, wherein the random access memory is referred to hereinafter as the "RAM". The line RAM 50 stores the image data of one scan line processed by the shading correction. The write signal for storing the image data into the line RAM 50 is outputted from the CPU 42, and CPU 42 obtains the image data of one scan line from the line RAM 50. The CPU 42 drives the lens motor 12 through a driver 70 and also drives the focusing motor 13 through a driver 72. Furthermore, the CPU 42 is connected to an electrically erasable programmable read only memory (which is referred to hereinafter as "EEPROM") 74 which is a non volatile memory for storing the magnification etc., and the CPU 42 receives the signal outputted from a dip switch 76 for setting operation modes of the image reader. Moreover, the CPU 42 controls the whole operation of the image reader in accordance with the aforementioned signals, a motor signal, a lamp signal, a predetermined position signal and a command signal etc..

The attribute data of 4 bits described below in detail is stored into the attribute RAM 52 by inputting the command with use of an operation panel (not shown). A dither read only memory (which is referred to hereinafter as the dither ROM) 54 generates a threshold value of a dither pattern I or a dither pattern II according to the attribute data $d_0$ when the dither mode is selected, wherein the threshold value is generated in the form of m×n matrix. A selector 56 selects the threshold value outputted from the dither ROM 54 or the binary threshold value outputted from a binary threshold value circuit 58 according to the attribute data $d_1$ so as to output the selected threshold value to a comparator circuit 48, wherein if the attribute data $d_1$ represents the dither mode, the selector 56 outputs the threshold value outputted from the dither ROM 54 to the comparator circuit 48, and on the other hand, if the attribute data $d_1$ represents the binary mode, the selector 56 outputs the binary threshold value outputted from the binary threshold value circuit 58 to the comparator circuit 48.

If the attribute data $d_3$ is 0, the comparator circuit 48 compares the image data outputted from the shading circuit 46 with the threshold value outputted from the selector 56 so as to output the compared data to a selecting output circuit 60. On the other hand, if the attribute data $d_3$ is 1, the comparator circuit 48 outputs the white data to the selecting output circuit 60. Moreover, the comparator circuit 48 also outputs the compared data or the white data to the selecting output circuit 60 through an inverter 62. In accordance with the attribute data $d_2$, the selecting output circuit 60 outputs the reversed data or the non-reversed data to a printer (not shown) in synchronization with an effective image signal outputted from the CPU 42.

Next, the attribute data stored in the attribute RAM 52 will be described below in detail.

In the preferred embodiment, the image is divided into regions respectively having an area of 1 mm by 1 mm, and the attribute data such as the binary, the half tone etc. is stored into the attribute RAM 52 corresponding to each of the regions and the editing of the image is performed in the unit of each of the regions according to the attribute data stored in the attribute RAM 52.

The attribute data stored in the attribute RAM 52 is composed of 4 data bits $d_3$, $d_2$, $d_1$ and $d_0$, and each bit of the attribute data represents the attribute information shown in Table 1, respectively. That is, the attribute data $d_0$ designates either of two dither patterns, the dither pattern I and the dither pattern II. The attribute data $d_1$ designates either of the binary processing or the dither processing. The attribute data $d_2$ designates either reverse or non reverse of the image. The attribute data $d_3$ designates either of void or non void of the image. Therefore, eight kinds of attributes shown in Table 2 are given to the image with use of the attribute data of 4 bits shown in Table 1, and the editing of the image such as masking, trimming, reverse, switching of binary or half tone etc. is performed according to the attribute data stored in the attribute RAM 52 described above.

Figure 3:
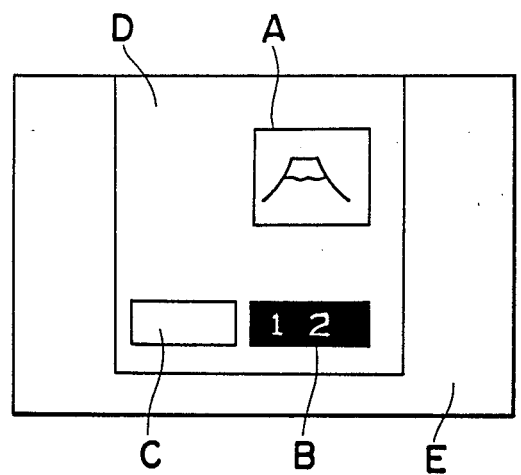
FIG. 3 is a front view showing one example of an image processed by attributes.

One example of the editing of the image will be described below, referring to FIGS. 3 and 4. Let us assume a document having A to D portions to be edited as follows:

A portion (picture): half tone processing by the dither pattern I (the attribute data is 1010), B portion (characters): reverse processing (the attribute data is 110X), C portion: void processing (the attribute data is 00XX), D portion (character): binary processing (the attribute data is 100X), and E portion (outside portion): white data (the attribute data is 00XX).

Figure 4:
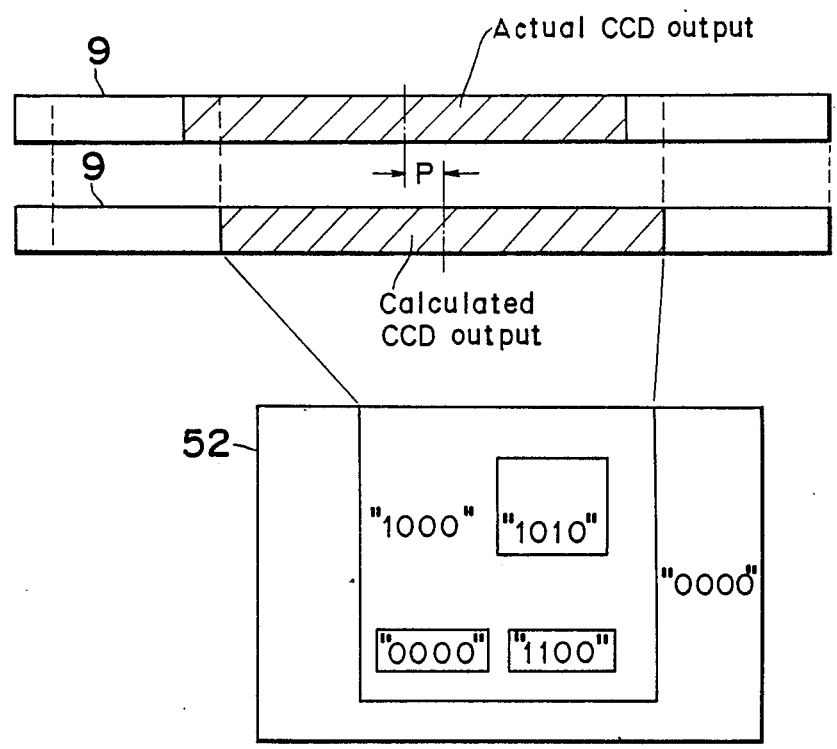
FIG. 4 is a front view showing the attribute data of the image shown in FIG. 3.

As shown in FIG. 4, the attribute data is stored into the attribute RAM 52 by each of the regions having an area of 1 mm by 1 mm, wherein "0" is set into the indeterminate number X.

Upon outputting the image data, according to the attribute data stored in the attribute RAM 52 for each of the regions having an area of 1 mm by 1 mm, the half tone processing is performed for the A portion (picture), and the binary processing is performed for the D portion (character) etc.. That is, in case 16 picture elements of the CCD image sensor 9 correspond to a length of 1 mm, the attribute data stored in the attribute RAM 52 is read out whenever the output data of 16 picture elements of the CCD image sensor 9 is read out, and the aforementioned image processing is switched over according to the attribute data.

In order to read the image of the document correctly, it is important to set a reference position. Since the optical axis does not always coincide with the center position of the pattern plate 16 (FIG. 5) because of a mounting error of the CCD holder 14 and the carriage 10, and, practically, there may be a mechanical shift length P as shown in the upper portion of FIG. 4. Therefore, the center position of the document region on the glass plate 4 does not always coincide with the calculated center position of the CCD image sensor 9 (which is the position of a half number of picture elements of the CCD image sensor 9). The shift length P may be larger than 1 mm which is the unit of the editing of the image. When the image of the document is read based on the calculated center position, the image in one portion of the document region can not be read and superfluous data may be read. When the image is edited according to the attribute data stored in the attribute RAM 52 being read based on the calculated center position of the CCD image sensor 9, the editing of the image can not be performed with high precision.

Figure 5:
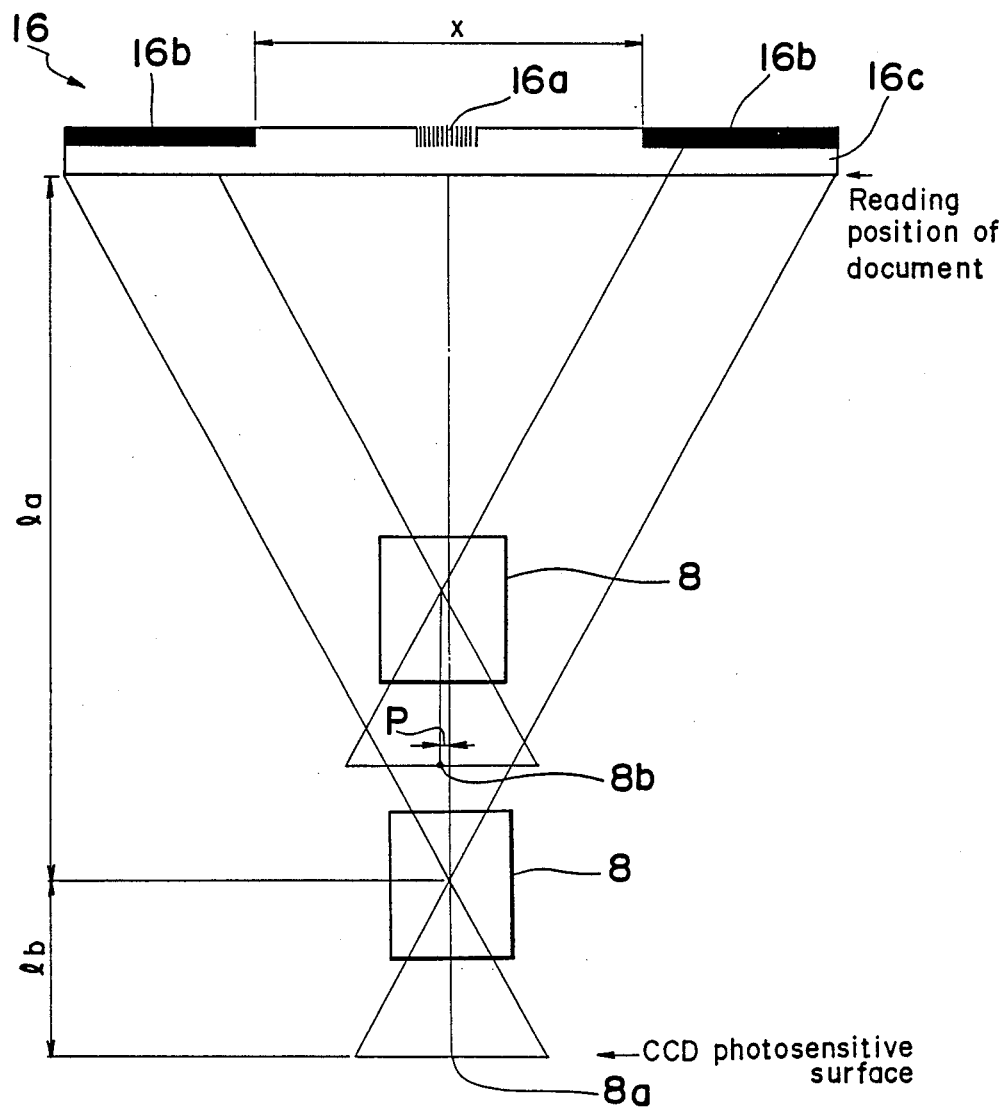
FIG. 5 is a plan view showing the positional relationship between a lens, a pattern and a CCD image sensor of the image reader shown in FIG. 1.

In order to edit the image with high precision, it is necessary to know the reference position for reading the image (the center position of the image in the preferred embodiment) before starting the editing of the image. Therefore, in the preferred embodiment, the center position of the image is automatically detected with use of a pattern plate 16 after the operation of the variable magnification, resulting in that, even though there is a mechanical shift length P during the operation of the variable magnification as shown in FIG. 5, the attribute data can be stored into the attribute RAM 52 always based on the proper center position 8a. The detection of the center position will be described below in detail.

Furthermore, the command for performing the detection of the center position may be provided, and the detection of the center position may be performed only when the host computer judges that it is necessary to perform the detection of the center position. For example, since the editing of the image is not performed when the same attribute is designated for the whole surface of the image, the detection of the center position may be omitted.

(c) Operation for the focus adjustment

The operation of the focus adjustment will be described below in detail, referring to FIGS. 5 and 6.

The magnification must be measured under the condition that the original system is in the infocus condition in the variable magnification mode.

The distance $l_a$ between the reading position and the lens 8 and the distance $l_b$ between the lens 8 and the CCD image sensor 9 must satisfy the following equations:

$$l_a = f(1 - 1/L\beta) \quad (1)$$

$$l_b = f(1 - \beta/L) \quad (2)$$

wherein f is the focal length of the lens 8, L the a reading magnification, and $\beta$ is a scale factor of the lens 8 upon reading the image.

The magnification and the focus condition are detected with use of the pattern plate 16 for detecting the magnification and the focus condition which is drawn at the back side of a document scale 15 disposed at a position corresponding to the front end portion of the document. The pattern plate 16 comprises a stripe pattern 16a for detecting the focus condition having the black and white lines which are alternately aligned repeatedly at a constant pitch in the center portion, and a pair of patterns 16b and 16b for detecting the magnification respectively having the belt like pattern which is drawn in black all over between which the pattern 16a is put, as shown in the upper portion of FIG. 5. At the document side of the pattern plate 16, a white pattern plate 16c for shading correction is disposed.

The magnification is detected by measuring the distance x between the pair of patterns 16b and 16b with use of the CCD image sensor 9. The focus condition is detected by measuring the density level of the white and black lines of the pattern 16a for detecting the focus condition with use of the CCD image sensor 9.

Figure 6:
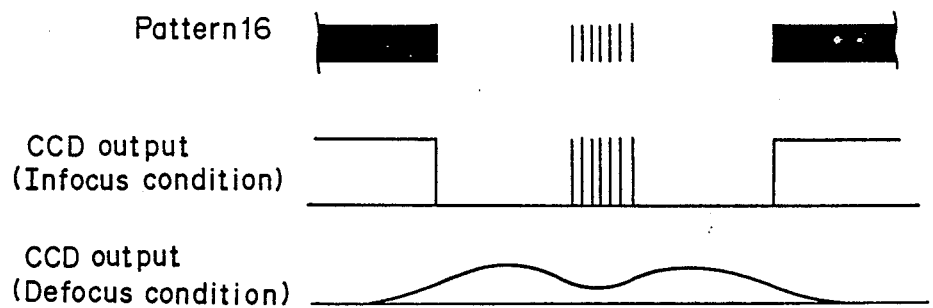
FIG. 6 is a view showing the relationship between a pattern for a focus detection and the output signal of the CCD image sensor in the image reader shown in FIGS. 1 and 2.

FIG. 6 shows the output signals of the CCD image sensor 9 in the infocus and defocus conditions when the pattern plate 16 is read by the CCD image sensor 9. As shown in FIG. 6, the CCD image sensor 9 outputs the intermediate value between the white image data and the black image data in the defocus condition; on the other hand, the CCD image sensor 9 outputs the value of the white image data or the black image data alternately corresponding to the white or black lines of the pattern 16a in the infocus condition. Therefore, the optical system is moved by rotating the focusing motor 12 so that the difference of density levels between the white image data and the black image data becomes maximum. Since the focus condition of the optical system changes when the magnification is changed, it is necessary to perform the focus adjustment. However, in practise, since the reading of the image is often performed in the equal magnification mode, the optical system is maintained to be in the infocus condition. Therefore, it is not necessary to perform the focus adjustment every time the power is supplied.

In the preferred embodiment, when the reading of the image is performed in the variable magnification mode, the information data in the variable magnification mode is stored in the EEPROM 74. When the power is turned off after the operation of the variable magnification mode, the lens 8 may be moved forward under the condition that the power is not supplied. Therefore, when the power is supplied again, the pattern plate 16 is read and the focus condition is detected as described above, and the focus adjustment is performed only when it is judged that it is necessary to perform the focus adjustment. When it is judged that the optical system is in the infocus condition and the reading of image is performed in the equal magnification mode the last time from the information data of the EEPROM 74, the focus adjustment is not performed. As a result, unnecessary focus adjustment can be prevented and the preparing time for reading the image can be reduced. Furthermore, since the image reader becomes in the standby condition after the pattern plate 16 is read and it is confirmed that the optical system is in the infocus condition, the image reader does not stand by in the defocus condition.

Moreover, once the focus adjustment is performed, there is almost no shift length P in the operation of the variable magnification mode thereafter, therefore, it is not necessary to perform the focus adjustment again.

(d) Operation on the undesirable state for the focus adjustment

At the beginning of the focus adjustment, normally, it is known where the CCD holder 14 moved by the focusing motor 13 is positioned. For example, when the position thereof is shifted to the stopper position, the case may happen that the optical system can not be in the infocus condition. Even though the optical system is in such an undesirable state for the focus adjustment, the focus adjustment may be performed by returning the focusing motor 13 to the initial position or by rotating the focusing motor 13 in the reverse rotation direction. Therefore, on the undesirable state for the focus adjustment, the following processing is performed in the preferred embodiment.

The optical system is judged as being in the undesirable state for the focus adjustment when the time for the focus adjustment exceeds a predetermined time such as 10 seconds. (Furthermore, for example, the optical system may be judged as being in the undesirable state for the focus adjustment when the optical system is not in the defocus condition after the focusing motor 13 is rotated by a predetermined distance.) The undesirable state for the focus adjustment is, for example, that the optical system is not moved even though the focusing motor 13 is rotated under the condition that the CCD image sensor 9 is positioned at the rightmost position hitting on the stopper.

When the optical system is judged as being in the undesirable state for the focus adjustment, the pattern plate 16 is read. Then, when the pattern plate 16 is not detected, the image reader is judged as having a processing error and the focus adjustment is finished. When a certain measure of the pattern plate 16 is detected, for example, the focusing motor 13 is returned to the original position and the focus adjustment is repeatedly performed a predetermined number of times of the readjustment.

When the optical system does not become in an infocus condition by the time the focus adjustment is repeatedly performed the predetermined number of times of the readjustment, the image reader is judged as having a processing error and the focus adjustment is finished. For example, when the maximum time of the focus adjustment is 10 seconds and the maximum number of times of the readjustment is 5, after the maximum time of 50 seconds, the image reader is judged as having a processing error and the focus adjustment is finished. As a result, the case is prevented that the illumination lamp 1 continuously turns on for the focus adjustment, resulting in that the safety of the image reader can be improved.

(e) Operation of the image reading

Figure 7:
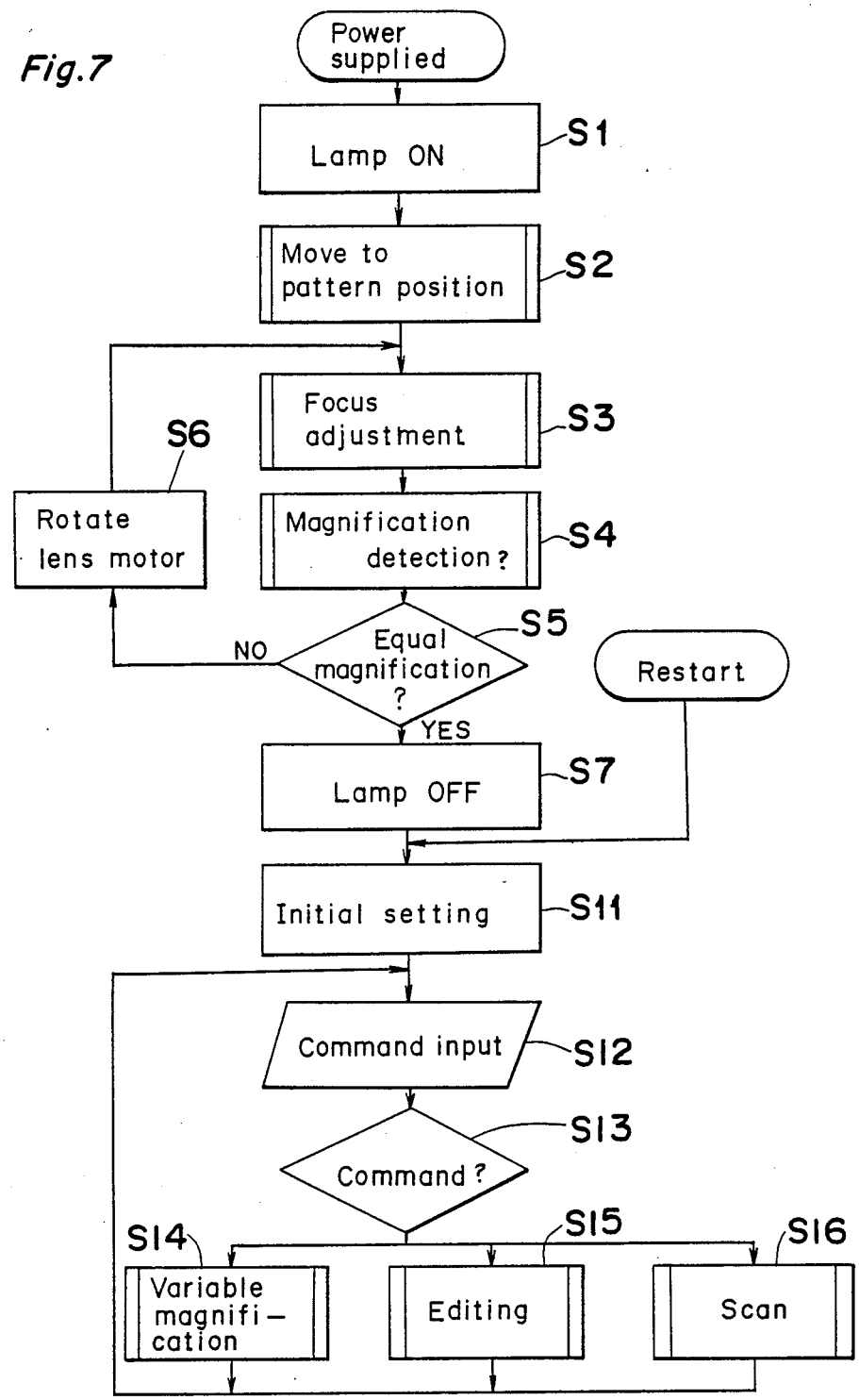
FIG. 7 is a flow chart showing an image reading routine of the image reader shown in FIGS. 1 and 2.

FIG. 7 shows the operation of the image reading of the image reader.

After the power is supplied to the image reader, the illumination lamp 1 is turned on at step S1. Next, the optical system including the illumination lamp 1 is moved to the position for illuminating the pattern plate 16 at step S2, and then, the focus adjustment is performed at step S3 and the magnification is detected at step S4. It is judged whether or not the detected magnification is the equal magnification at step S5. If the detected magnification is not the equal magnification at step S5, the program flow goes to step S6 and the lens motor 12 is rotated so that the carriage 10 is moved toward a predetermined focus position where the magnification is the equal magnification. Thereafter, the focus adjustment of step S3 and the magnification detection of step S4 are performed again. On the other hand, if the detected magnification is the equal magnification at step S5, the program flow goes to step S7. As a result, the lens 8 and the CCD image sensor 9 are fixed at the predetermined position where the magnification is the equal magnification.

At step S7, the illumination lamp 1 is turned off and an initial setting is performed at step 11, wherein the processing for the whole surface of the image is set to a mode which is either the binary mode, the half tone 1 mode or the half tone 2 mode. Thereafter, the CPU 42 enter into a command waiting condition.

Furthermore, in case the image reading is started again after the power is supplied, the initial setting is performed at step S11, and then, the CPU 42 enters into the command waiting condition.

There are provided a variable magnification command, an editing command, and a scan demand command etc. in the image reader. A command is input by operating the operation panel (not shown) at step S12, and then, the program flow branches out to steps S14 to S16 according to the input command at step S13.

When the variable magnification command is input, at step S14, the data of the measured focal length of the lens 8 is read out from the EEPROM 74, the moving distance of the CCD image sensor 9 and the lens 8 is calculated in accordance with the read data, and the CCD image sensor 9 and the lens 8 are moved by the calculated moving distance.

When the editing command is input, at step S15, the attribute data such as the masking, the trimming, and the reverse etc. is stored into the attribute RAM 52 so as to edit the image.

When the scan command is input, the image reader reads the image at step S16.

Figure 8:
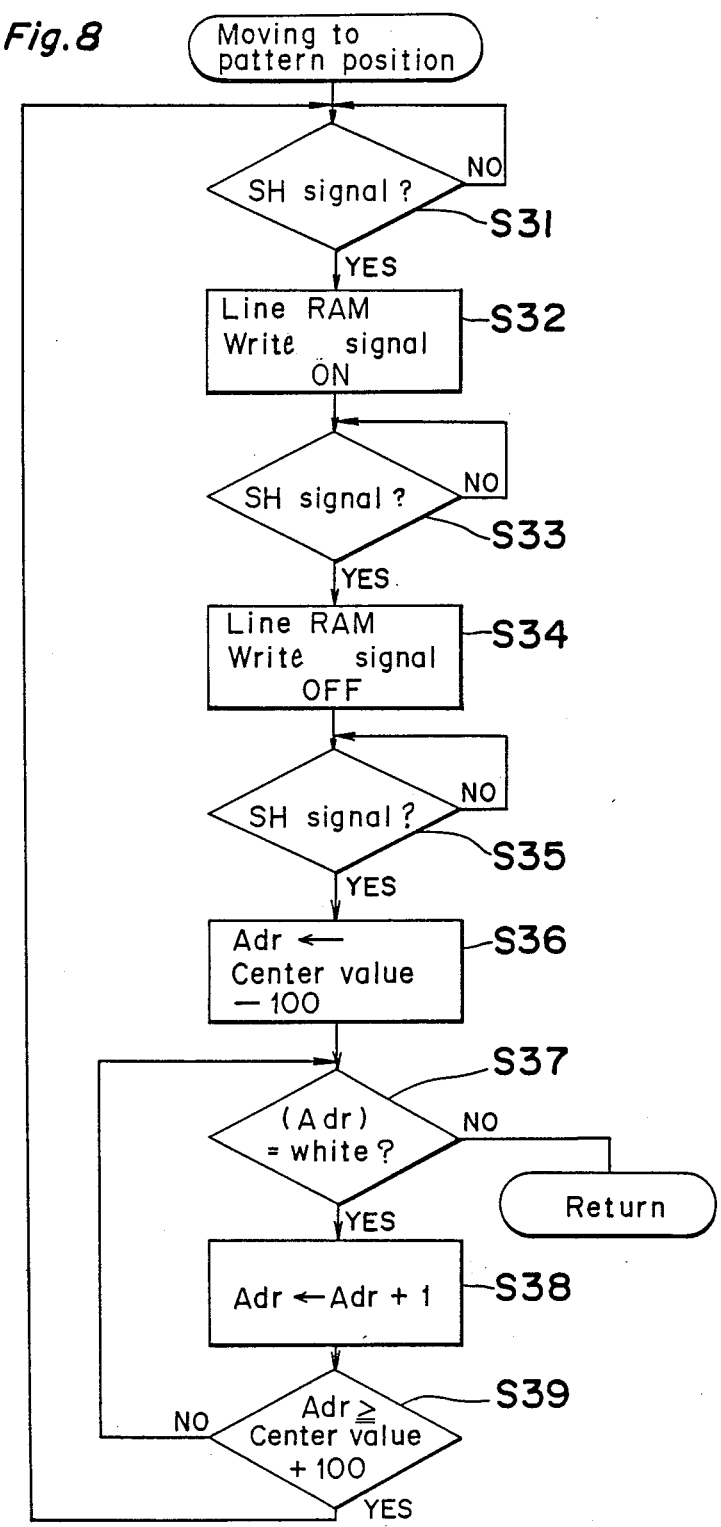
FIG. 8 is a flow chart showing a moving routine of the optical system to the pattern position of the image reader shown in FIGS. 1 and 2.

FIG. 8 is a flow chart (performed at step S2) showing the operation in which the optical system is moved to the position of the pattern plate 16.

In FIG. 8, first of all, the CPU 42 outputs the line RAM write signal to the line RAM 50 at step S32 in accordance with the shift signal SH for the CCD image sensor 9 which is input at step S31, and the image data outputted from the shading circuit 46 is stored into the line RAM 50. Thereafter, the CPU 42 stops outputting the line RAM write signal at step S34 in accordance with the next shift signal SH which is input at step S33.

Thereafter, the data of the center value −100 is set to the pointer address of the line RAM 50 at step S36 in accordance with the shift signal SH which is input at step S35. Then, the pointer address is increased by 1 at step S38 and it is checked whether or not the image data stored in the designated pointer address is the black data at step S37. When the image data stored in the designated pointer address is the black data at step S37, it is judged that the optical system has reached the position of the pattern 16a for the focus detection, and the program flow returns. On the other hand, when the pointer address becomes the center value +100 at step S39, it is judged that the optical system has not reached the pattern plate 16, and then, the program flow goes back to step S31 and the aforementioned processing is performed again.

Figure 9A:
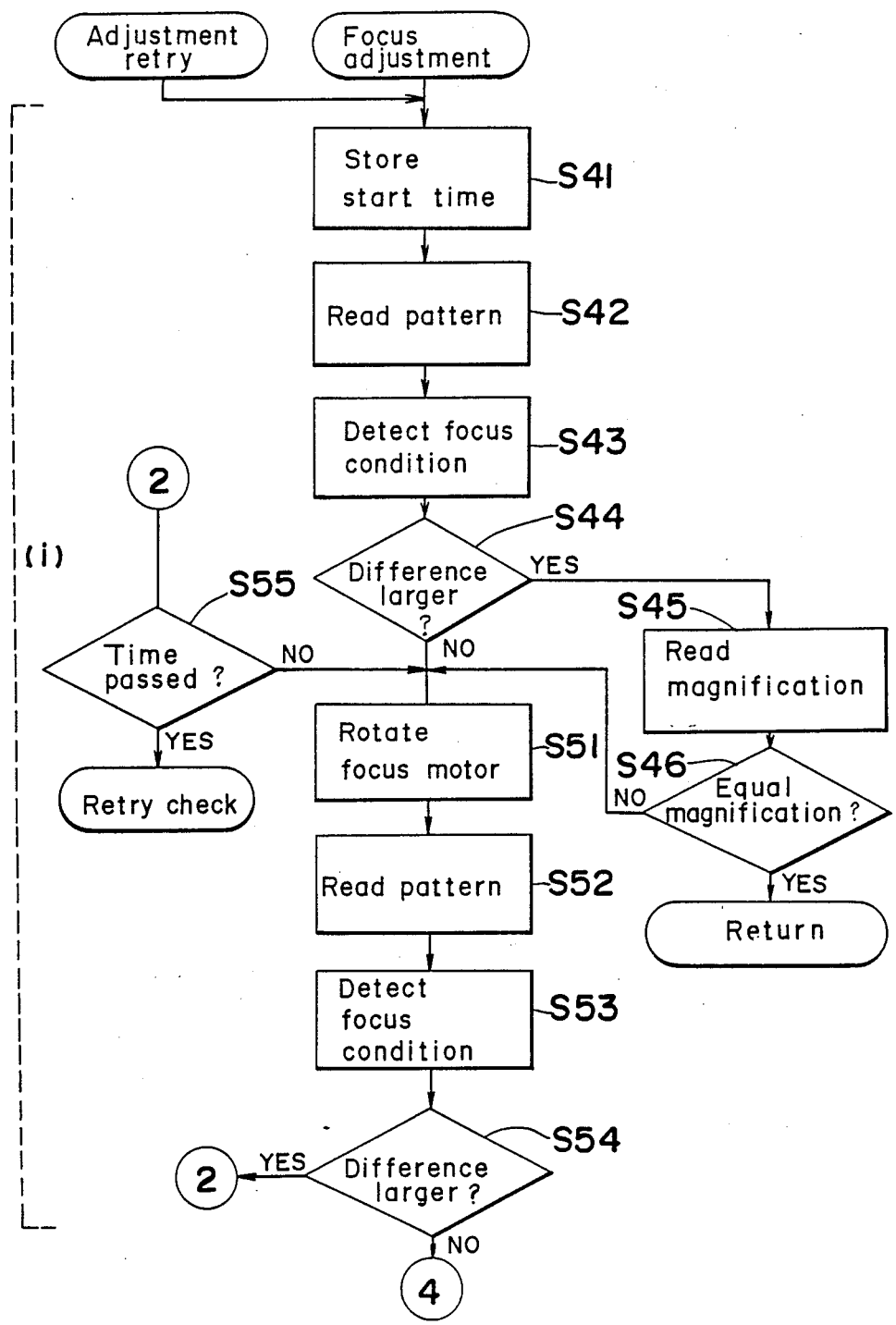
FIGS. 9a and 9b are flow charts showing a focus adjustment routine of the image reader shown in FIGS. 1 and 2.
Figure 9B:
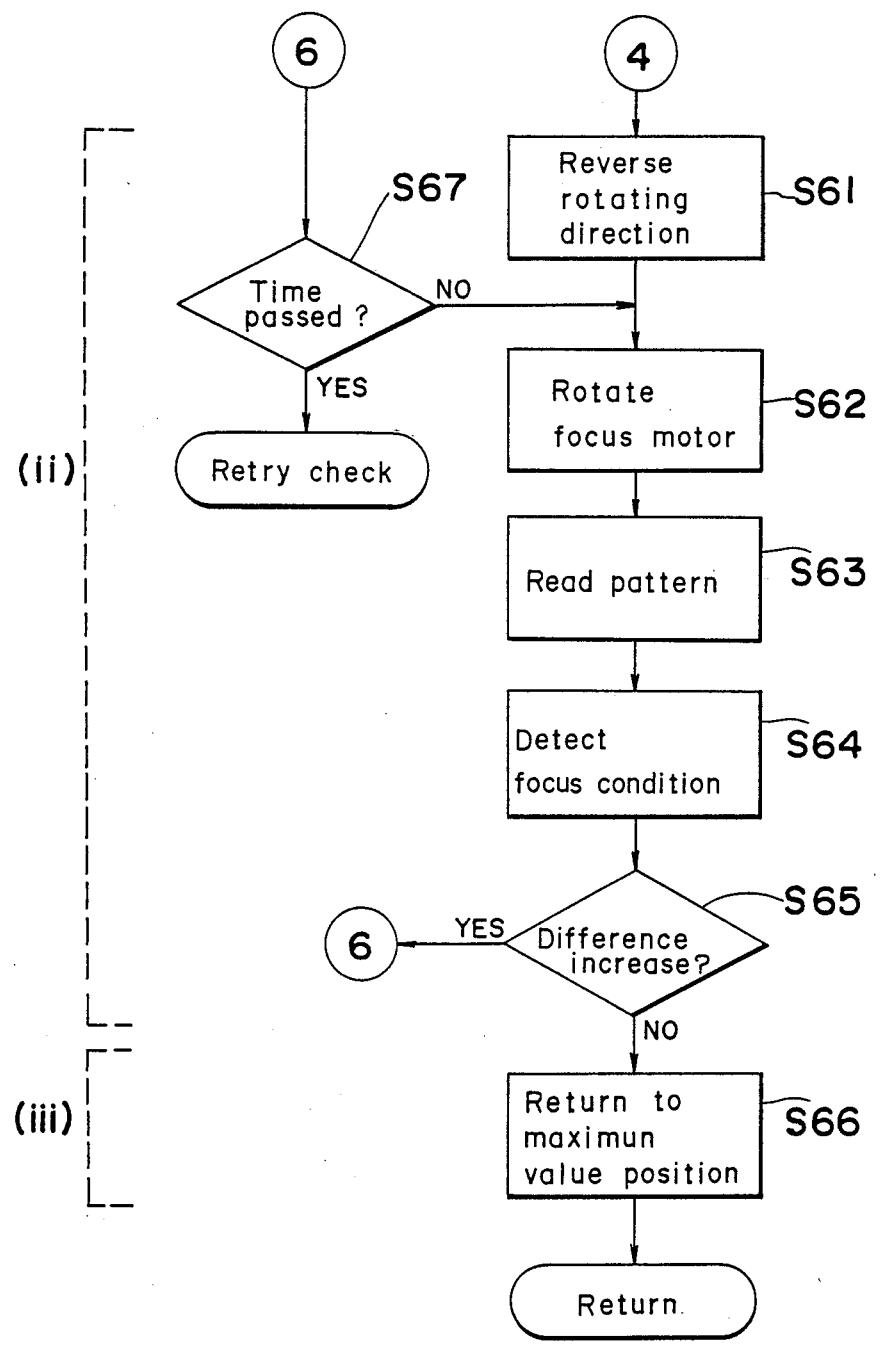

FIGS. 9a and 9b are flow charts of the focus adjustment performed at step S3.

In FIG. 9a, the start time when the focus adjustment is started is stored at step S41 and then, at step S42, the CCD image sensor 9 reads the pattern 16a for the focus detection, the read pattern data is converted to digital data, the shading correction is performed for the digital data, and the corrected digital data is stored into the line RAM 50. Thereafter, the difference of density levels between the white image and the black image representing the focus condition of the optical system is calculated from the multi gradation data of the pattern 16a for the focus detection which is stored in the line RAM 50 at step S43, and it is judged whether or not the difference of density levels between the white image and the black image is larger than a predetermined value at step S44. If the difference of density levels is larger than the predetermined value at step S44, it is judged that the optical system is in the infocus condition or close to the infocus condition, and the program flow goes to step S45. At step S45, the magnification set before the power is supplied is read out from the EEPROM 74, and it is judged whether or not the read magnification is the equal magnification at step S46. If the read magnification is the equal magnification at step S46, the optical system is in the infocus condition in the equal magnification mode, and the program flow returns without the focus adjustment.

On the other hand, if the read magnification is not the equal magnification at step S46, or if the difference of density levels is not larger than the predetermined value at step S44, the focusing motor 13 is rotated in a predetermined direction so as to move the CCD image sensor 9 at step S51, and then, the pattern 16a for the focus detection is read at step S52 as well as at step S42 and the difference of density levels between the white image and the black image representing the focus condition of the optical system is calculated at step S53 as at well as step S43.

At step S54, it is judged whether or not the difference of density levels calculated at step S53 is larger than the difference of density levels calculated the last time. If the difference of density levels calculated at step S53 is larger than the difference of levels calculated the last time, it is judged that the lens 8 has been moved toward the position where the optical system is in the infocus condition, the current time is read, the elapsed time between the start time and the current time is calculated, and then, it is judged whether or not the elapsed time is larger than a predetermined focus adjustment time at step S55. If the elapsed time is not larger than the predetermined focus adjustment time at step S55, the program flow goes back to step S51, and then, the aforementioned processing is performed again. On the other hand, if the elapsed time is larger than the predetermined focus adjustment time at step S55, the CPU 42 stops the focus adjustment, and then, the program flow goes to a retry check routine shown in FIG. 11.

If the difference of density level calculated at step S53 is not larger than the difference of density level calculated the last time at step S54, it is judged that the lens 8 has been moved in the opposite direction to the direction toward the position where the optical system is in the infocus condition, the rotating direction of the focusing motor 13 is reversed at step S61 and the focusing motor 13 is rotated so as to move the CCD holder 14 by a predetermined distance at step S62. Thereafter, the pattern 16a for the focus detection is read at step S63 as well as at step S51 and the difference of density levels between the white image and the black image representing the focus condition is calculated at step S64. It is judged whether or not the difference of density level calculated at step S64 is larger than the difference of density level calculated the last time at step S65.

If the difference of density level calculated at step S64 is larger than the difference of density level calculated the last time at step S65, it is judged that the lens 8 has been moved toward the position where the optical system is in the infocus condition, the current time is read, the elapsed time between the start time and the current time is calculated, and it is judged whether or not the elapsed time is larger than the predetermined focus adjustment time at step S67.

If the elapsed time is not larger than the predetermined focus adjustment time at step S67, the program flow goes back to step S62, and then, the aforementioned processing is performed again. On the other hand, if the elapsed time is larger than the predetermined focus adjustment time at step S67, the CPU 42 stops the focus adjustment, and then, the program flow goes to the retry check routine shown in FIG. 11.

If the difference of density level calculated at step S64 is not larger than the difference of level calculated the last time at step S65, it is judged that the CCD holder 14 has been passed through the position where the optical system is in the infocus condition, the focusing motor 13 is rotated so that the CCD holder 14 is moved back to the position where the difference of density levels between the white image and the black image is maximum at step S66, and then, the program flow returns.

In the image reader, the focusing motor 13 is a pulse motor, and the rotating amount of the focusing motor 13 corresponds to an input pulse number. The pulse number of one time which is input to the focusing motor 13 is predetermined properly so that the optical system becomes in the infocus condition easily.

Figure 10A:
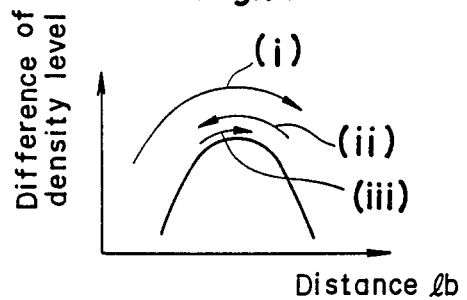
FIG. 10a is a graph showing the relationship between the distance between the lens and the CCD image sensor and the difference of density levels between white and black upon the focus adjustment of the image reader shown in FIGS. 1 and 2.
Figure 10B:
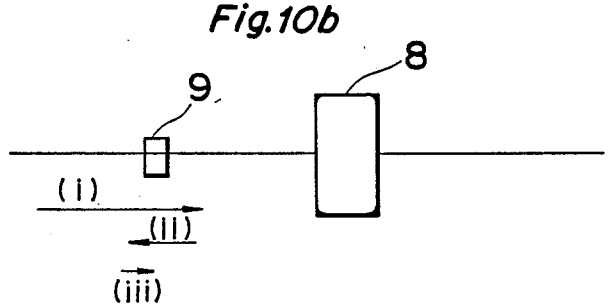
FIG. 10b is a plan view showing the positional relationship between the lens and the CCD image sensor of the image reader shown in FIGS. 1 and 2.

In the aforementioned processing of the focus adjustment shown in (i), (ii) and (iii) of FIG. 9, the difference of density levels between the white image and the black image varies for the distance $l_b$ as shown in FIG. 10a, and the CCD image sensor 9 is moved for the lens 8 as shown in FIG. 10b.

In the present preferred embodiment, it is checked whether or not the image reader is in the undesirable state for the focus adjustment by judging whether or not the elapsed time for the focus adjustment is larger than the predetermined focus adjustment, however, it may be checked whether or not the image reader is in the undesirable state for the focus adjustment by judging whether or not the driving pulse number applied to the focusing motor 13 is larger than a predetermined value. Furthermore, it may be checked whether or not the image reader is in the undesirable state for the focus adjustment by judging whether or not either the aforementioned elapsed time or the aforementioned driving pulse number is larger than respective predetermined values.

Figure 11:
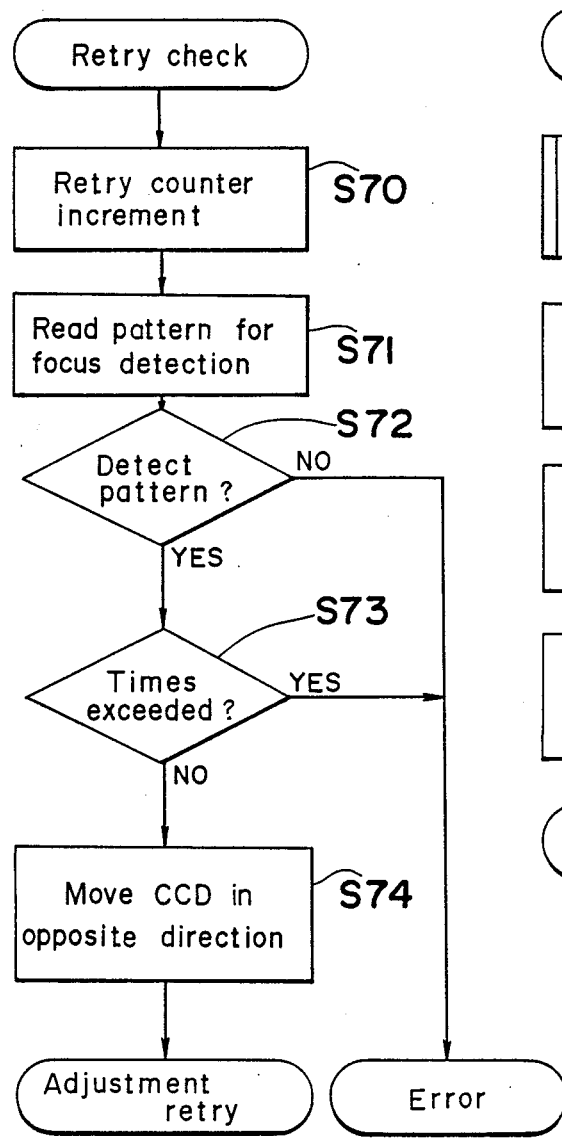
FIG. 11 is a flow chart showing a retry check routine of the image reader shown in FIGS. 1 and 2.

FIG. 11 is a flow chart of the retry check routine performed after the program flow is branched out from steps S55 and S67. In the retry check routine, since there is a possibility that the focus adjustment can not be performed within the predetermined focus adjustment time depending on the initial position of the focusing motor 13, it is judged whether or not the focus adjustment is performed again.

First of all, a retry counter for counting the repetition number of times of the retry check is increased by 1 at step S70, wherein the retry counter is reset to "0" when the power is supplied, and then, the CCD image sensor 9 reads the pattern plate 16 for the focus detection at step S71, and it is judged whether or not the pattern plate 16 is detected in the image read by the CCD image sensor 9 at step S72. Normally, even though the optical system is in the defocus condition, there is a certain measure of the difference of density levels between the black image read by both of the end portions of the CCD image sensor 9 and the white image read by the center portion of the CCD image sensor 9. If a certain measure of the difference of density levels is detected by the CCD image sensor 9, it is judged that the pattern plate 16 is detected.

If the pattern plate 16 is detected at step S72, it is judged whether or not the repetition number of times of the rotary check is larger than a predetermined value at step S73. If the repetition number of times of the retry check is not larger than the predetermined value at step S73, the focusing motor 13 is rotated so that the CCD image sensor 9 is moved in the opposite direction to the direction toward the lens 8 at step S74, and then, the program flow goes to step S41 shown in FIG. 9a so as to perform the focus adjustment again.

If the pattern plate 16 is not detected at step S72 and the repetition number of times of the retry check is larger than the predetermined value, it is judged that the image reader is in the undesirable state for the focus adjustment in which the optical system does not become in the infocus condition even though the focus adjustment is performed still more, and then, the CPU 42 stops the focus adjustment.

In the present preferred embodiment, the focusing motor 13 is rotated so that the CCD image sensor 9 is moved in the opposite direction to the direction toward the lens 8 at step S74 when the focus adjustment is performed again, however, the focusing motor 13 may be rotated so that the CCD image sensor 9 returns to a predetermined original position.

Figure 12:
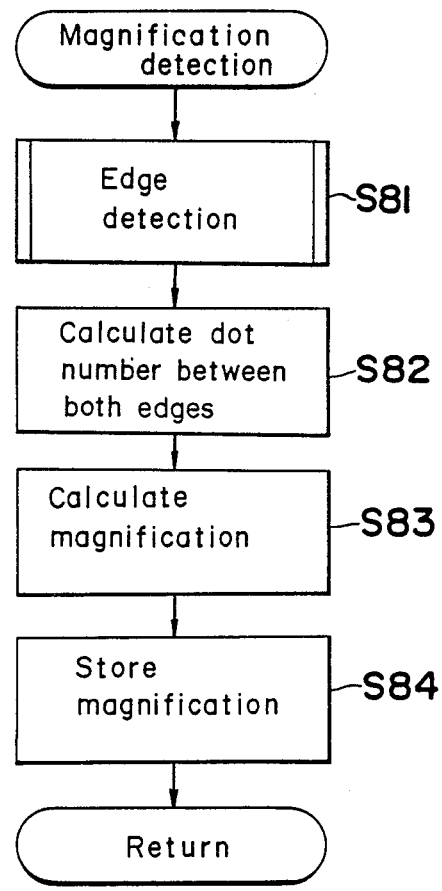
FIG. 12 is a flow chart showing a magnification detecting routine of the image reader shown in FIGS. 1 and 2.

FIG. 12 is a flow chart of the magnification detection routine performed at step S4.

In FIG. 12, first of all, each of the inner edge portions of the black patterns 16b and 16b positioned at both of the end portions of the pattern plate 16 is read by the CCD image sensor 9, the addresses of the CCD image sensor 9 corresponding to the images changing from the black data to the white data and from the white data to the black data are obtained at step S81. Thereafter, the dot number between both of the inner edge portions of the black patterns 16b and 16b is obtained by calculating the difference between both of the addresses of the CCD image sensor 9 obtained at step S82, the ratio of the dot number between both of the inner edge portions to the dot number in the equal magnification mode is calculated as the magnification at step S83, and then, the magnification is stored in the EEPROM 74 at step S84.

In the present preferred embodiment, the length between both of the inner edge portions of the black patterns 16a and 16b is 140 mm, and the dot number in the equal magnification mode is 2205.

Figure 13:
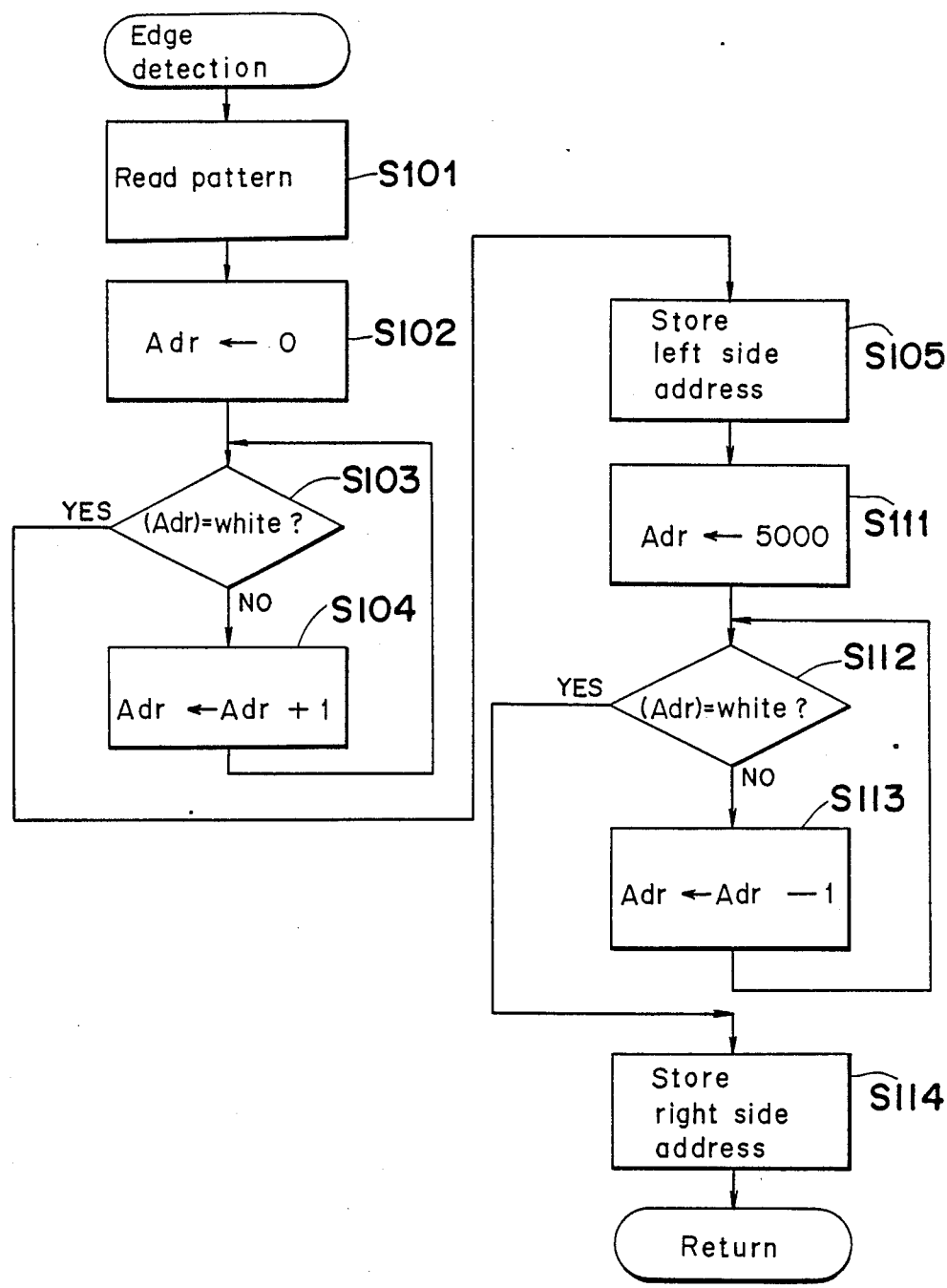
FIG. 13 is a flow chart showing an edge detecting routine of the image reader shown in FIGS. 1 and 2.

FIG. 13 is a flow chart of the edge detection routine performed at step S81.

In FIG. 13, first of all, the pattern plate 16 is read by the CCD image sensor 9, the read data is converted to digital data, the shading correction of the converted digital data is performed, and the corrected data is stored in the line RAM 50 at step S101. Thereafter, the address of the pointer for reading out the data stored in the line RAM 50 is reset to "0" at step S102, and it is judged whether or not the data stored in the address of the line RAM 50 indicated by the pointer is the white data at step S103. There is the black pattern 16b at the leftmost portion of the pattern plate 16, therefore, the data stored in the address "0" corresponding to the vicinity of the leftmost portion of the pattern 16 must be the black data. If the data is the black data at step S103, the address is increased by 1 at step S104, and it is judged again whether or not the data stored in the increased address is the white data at step S103. If the data is the white data at step S103, the address of the image changing from the black data to the white data is obtained, and the address is stored at step S105.

Thereafter, a value (for example, 5000) corresponding to the rightmost portion of the right black pattern 16b is set to the address of the pointer at step S111, and the address of the pointer is decreased by 1 at step S113 until the data stored in the address of the pointer becomes the white data at step S112. If the data is the white data at step S112, the address of the image changing from the black data to the white data is obtained, wherein the obtained address is the address of the inner edge portion of the right black pattern 16b. The address of the inner edge portion of the right black pattern 16b is also stored at step S114, and then, the program flow returns.

Figure 14:
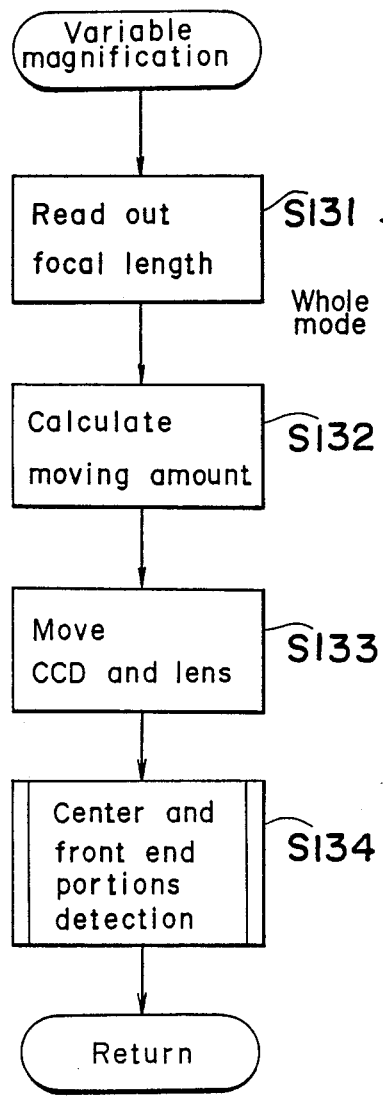
FIG. 14 is a flow chart of a variable magnification routine of the image reader shown in FIGS. 1 and 2.

FIG. 14 is a flow chart of the variable magnification routine performed at step S14. In the present preferred embodiment, the center position of the document image is detected every operation of the variable magnification routine, and the shift amount caused by a mechanical shift is obtained. In the variable magnification routine, the magnification $L_2$ to be set is input with use of the operation panel (not shown) after the variable magnification command is input.

In FIG. 14, first of all, the focal length f of the lens 8 stored in the EEPROM 74 is read out at step S131, and the moving amounts $\Delta l_a$ and $\Delta l_b$ are calculated according to the following equations at step S132.

$$\Delta l_a = f\{(1-1/L_2\beta)-(1-1/L\beta)\} \quad (3)$$

$$\Delta l_b = f\{(1-\beta/L_2)-(1-\beta/L)\} \quad (4)$$

wherein L is the current magnification.

Thereafter, the motors 12 and 13 are rotated so that the lens 8 and the CCD image sensor 9 are moved according to the calculated moving amounts at step S133, and the center portion and the front end portion of the document image are detected at step S134.

Figure 15:
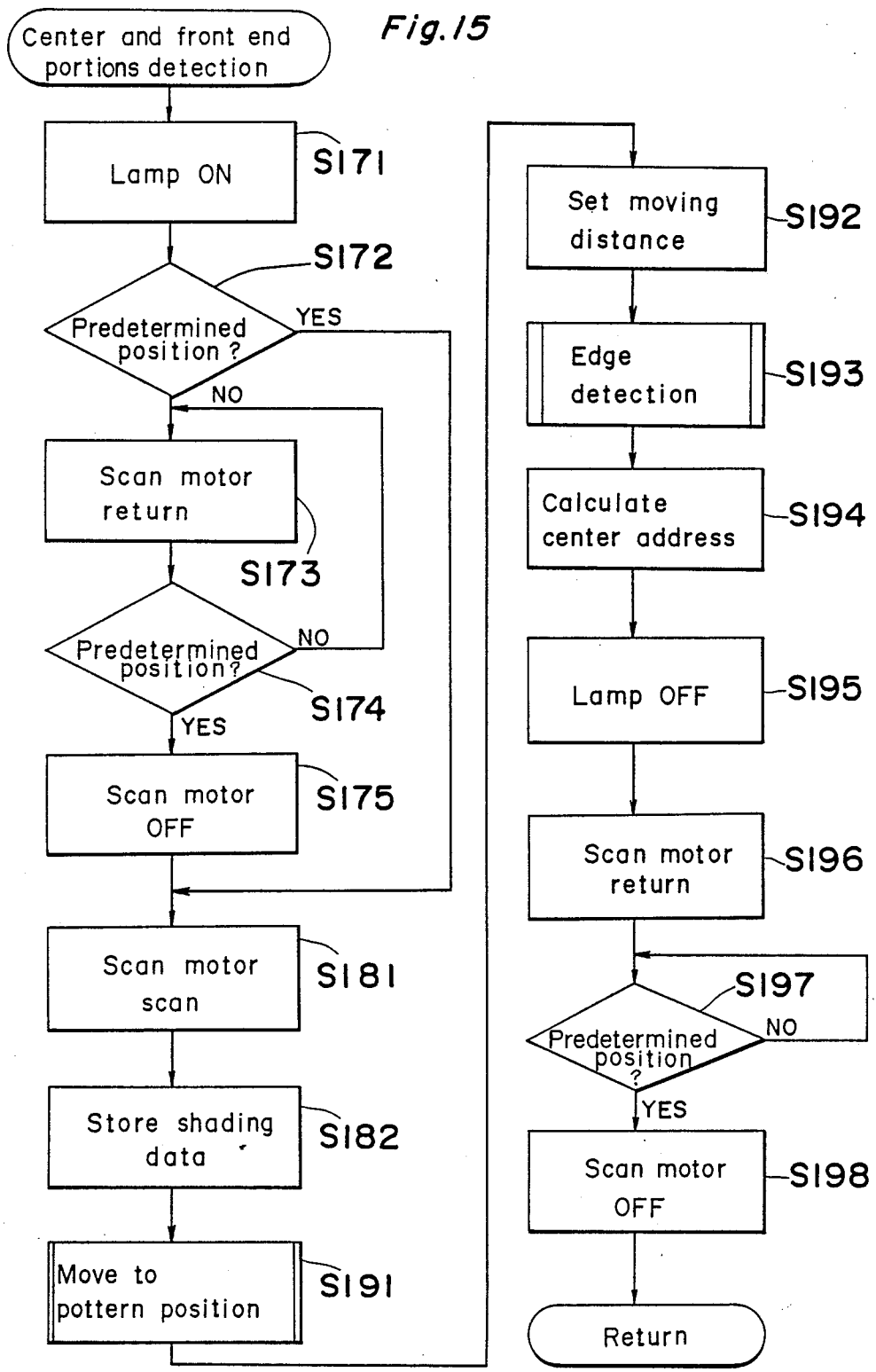
FIG. 15 is a flow chart showing a center portion and front end portion detecting routine of a document image of the image reader shown in FIGS. 1 and 2.

FIG. 15 is a flow chart of the detection routine of the center and front end portions of the document image performed at step S134.

In FIG. 15, first of all, the illumination lamp 1 is turned on at step S171 and it is judged whether or not the optical system is positioned at a predetermined position at step S172. If a predetermined position switch (not shown) is in the ON state, it is judged that the optical system is positioned at the predetermined position at step S172, and then, the program flow goes to step S181. On the other hand, if the predetermined position switch is in the OFF state, it is judged that the optical system is not at the predetermined position at step S172, the scan motor (not shown) is rotated so that the optical system is moved toward the predetermined position until the optical system is positioned at the predetermined position at steps S173 and S174, and then, the scan motor is stopped at step S175.

The scan motor is rotated until the optical system is positioned at the white pattern of the pattern plate 16 at step S181, and a shading data is stored in a RAM for shading (not shown) of the shading circuit 46 at step S182. The shading circuit 46 outputs the image data processed with the shading correction to the comparator circuit 48 and the line RAM 50 in accordance with the data stored in the RAM for shading and the analog/digital converted image data.

Thereafter, the optical system is moved to the pattern position at step S191, as shown in FIG. 8. The distance between the pattern position and the front end portion of the document positioned on the glass plate 4 is known, and the distance value is set to the moving distance of the scan motor at step S192. Then, both of the inner edge portions of the black patterns 16b and 16b of the pattern plate 16 are detected at step S193, and the center address of the CCD image sensor 9 corresponding to the center portion of the document image is calculated from the addresses corresponding to the detected inner edge portions of the black patterns 16b and 16b. These steps S193 and S194 are performed in order to correct the position of the lens 8, because there is a possibility that the center position 8b of the lens 8 is shifted from the actual center position 8a as shown in FIG. 5 when the lens 8 is moved to the position thereof of the variable magnification mode.

Thereafter, the illumination lamp 1 is turned off at step S195, the scan motor is rotated until the optical system is positioned at the predetermined position at steps S196 and S197, and then, the scan motor is stopped rotating at step S198.

Figure 16:
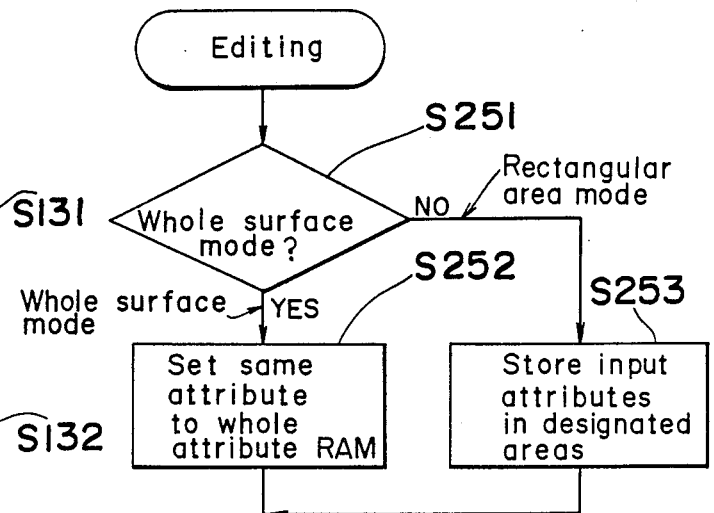
FIG. 16 is a flow chart showing an editing routine of the image reader shown in FIGS. 1 and 2.

FIG. 16 is a flow chart of the editing routine performed at step S15. In the editing routine, there is provided a whole surface mode and a rectangular area mode.

In FIG. 16, first of all, it is judged whether or not the operation mode of the editing routine is the whole surface mode at step S251. If the operation mode is the whole surface mode, the input same attribute such as the half tone etc. is set to the whole area of the attribute RAM 52 at step S252, and then, the program flow returns. On the other hand, if the operation mode is not the whole surface mode at step S251, the operation mode is the rectangular area mode, the input different attributes such as the masking, the trimming, the partial attribute setting etc. are respectively set to the inner and outer portions of the rectangular area of the attribute RAM 52 designated by the coordinates of two points at step S253 so that the image processing in the inner portion of the rectangular area is different from the image processing in the outer portion of the rectangular area, and then, the program flow returns.

Figure 17A:
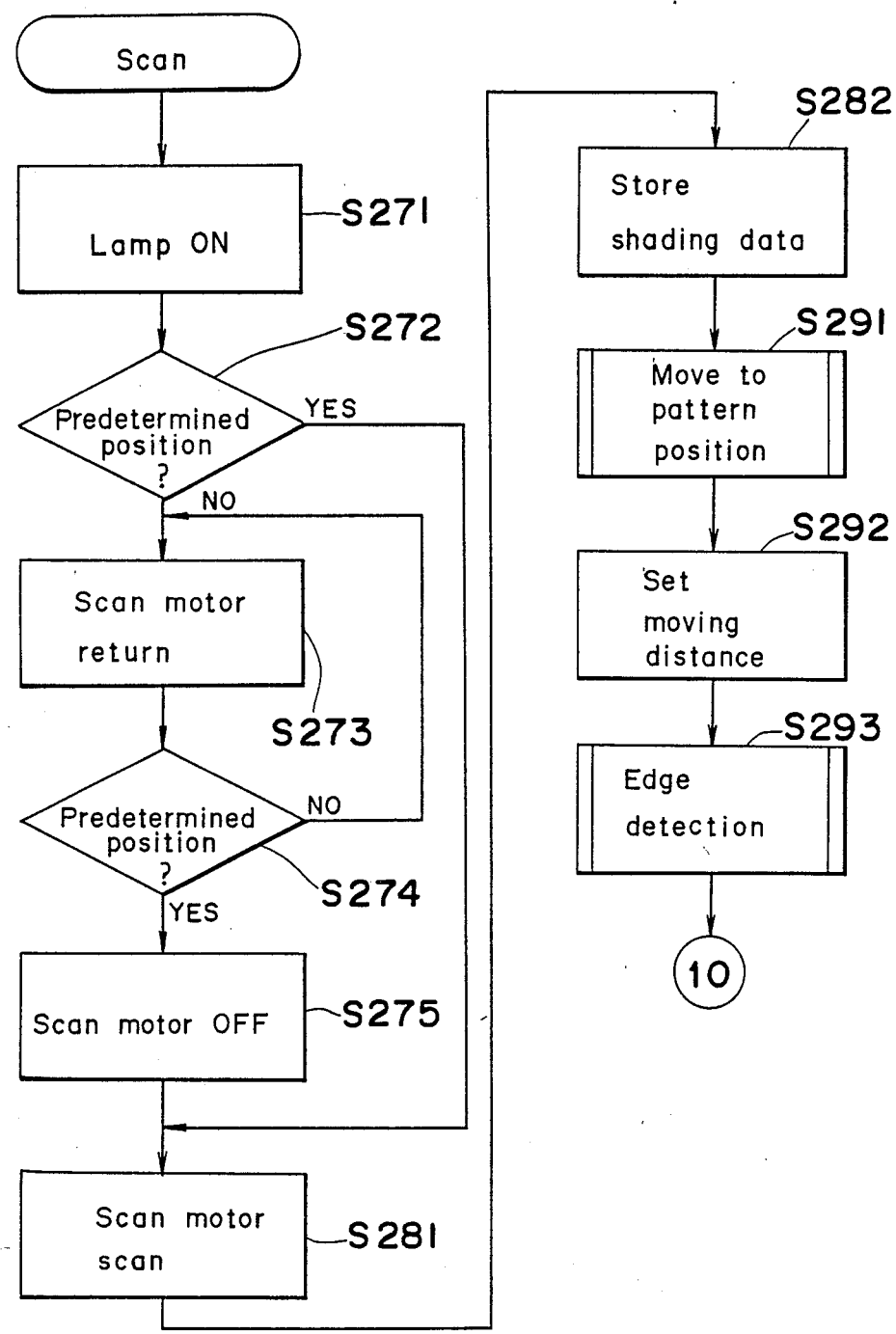
FIGS. 17a and 17b are flow charts showing a scan routine of an image of the image reader shown in FIGS. 1 and 2.
Figure 17B:
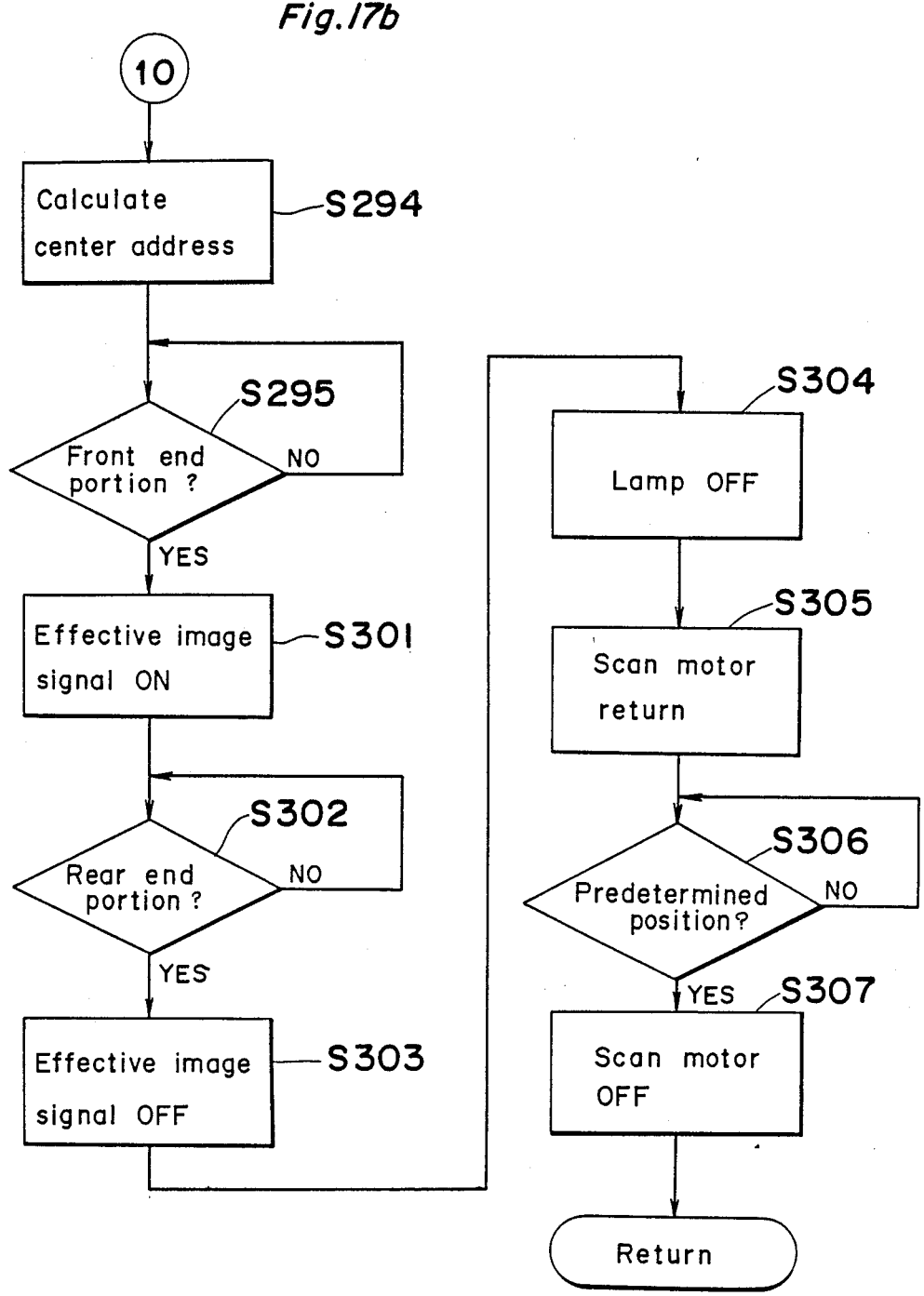

FIGS. 17a and 17b are flow charts of the scan routine of the image performed at step S16.

In FIGS. 17a and 17b, first of all, the illumination lamp 1 is turned on at step S271, and it is judged whether or not the optical system is positioned at the predetermined position at step S272. If the predetermined position switch (not shown) is in the ON state, it is judged that the optical system is positioned at the predetermined position, and then, the program flow goes to step S281. On the other hand, if the predetermined position switch is in the OFF state, it is judged that the optical system is not positioned at the predetermined position, the scan motor (not shown) is rotated in the direction toward the predetermined position of the optical system until the optical system is positioned at the predetermined position at steps S273 and S274, and then, the scan motor is stopped rotating at step S275.

Thereafter, the scan motor is rotated until the optical system is positioned at the position of the white pattern of the pattern plate 16 at step S281, and the shading data is stored in the RAM for shading (not shown) of the shading circuit 46 at step S282. The shading circuit 46 outputs the image data processed with the shading correction to the comparator circuit 48 and the line RAM 50 in accordance with the data stored in the RAM for shading and the analog/digital converted image data.

Thereafter, the optical system is moved to the pattern position at step S291, as shown in FIG. 8. The distance between the pattern position and the front end portion of the document positioned on the glass plate 4 is known, and the distance value is set to the moving distance of the scan motor at step S292. Thereafter, both of the inner edge portions of the black patterns 16b and 16b of the pattern plate 16 are detected at step S293 as shown in FIG. 12, and the center address of the CCD image sensor 9 is calculated from the detected addresses of both of the inner edge portions at step S294. These steps S293 and S294 are performed so as to correct the position of the lens 8, because there is a possibility that the center position 8b of the lens 8 is shifted from the actual center position 8a thereof as shown in FIG. 5 when the lens 8 is moved to the position thereof of the variable magnification mode.

Thereafter, the scan motor is rotated until the optical system is positioned at the front end portion of the document at step S295. Since the moving distance of the optical system at step S295 is previously known, the scan of the optical system can be started properly from the front end position of the document even though the operation mode is the variable magnification mode.

As soon as the optical system reaches the front end portion of the document, the effective image signal is turned on, and then, the CCD image sensor 9 starts reading the image at step S301. As soon as the optical system reaches the rear end portion of the document at step S302, the effective image signal is turned off, and the reading of the image is completed at step S303. Thereafter, the illumination lamp 1 is turned off at step S304, the scan motor is rotated until the optical system is positioned at the predetermined position at steps S305 and S306, and then, the scan motor is stopped rotating at step S307.

In the present preferred embodiment, the center portion of the document image is detected during scanning of the optical system, however, the center portion of the document image may be detected after the optical system is moved to the pattern position before scanning of the optical system.

Furthermore, since the center portion of the document image can not be detected as far as the image is read in the variable magnification mode, however, the center portion of the document image may be detected only in the variable magnification mode.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

TABLE 1

| Attribute data | Attribute data Attribute |
|---|---|
| $d_3$ | White/Effective picture element |
| $d_2$ | Reverse/Non reverse |
| $d_1$ | Binary/Dither |
| $d_0$ | Dither pattern I/Dither pattern II |

TABLE 2

| $d_3 d_2 d_1 d_0$ | Attribute data Attribute |
|---|---|
| 0 0 X X | White |
| 0 1 X X | Black |
| 1 0 0 X | Binary |
| 1 0 1 0 | Dither I |
| 1 0 1 1 | Dither II |
| 1 1 0 X | Reverse and Binary |
| 1 1 1 0 | Reverse and Dither I |
| 1 1 1 1 | Reverse and Dither II |

(Notes)
X: Indeterminate data

What is claimed is:

1. An image reader comprising:
   an image sensor for reading an image of a document through a lens;
   a variable magnification means for moving said lens so as to vary a magnification of the image formed on said image sensor;
   a focus adjusting means for moving said image sensor in a direction parallel to an optical axis of said lens;
   a pattern plate disposed in the vicinity of a reading area of the document, said pattern plate having a predetermined pattern comprised of plural images;
   a magnification measuring means for measuring the magnification of the image formed on said image sensor in accordance with the interval between the images of said pattern plate being read by said image sensor and for storing the measured magnification;
   a focus judging means for judging the infocus condition of the image formed on said image sensor in accordance with the images of said pattern plate being read by said image sensor; and an initializing means for finishing an initializing processing without making said focus judging means operate in case said focus adjusting means judges that the image formed on said image sensor is in the infocus condition when the power is supplied to said image reader and the last magnification stored by said magnification measuring means is the equal magnification.

2. The image reader as defined in claim 1, wherein said magnification measuring means comprises a non volatile memory for storing the measured magnification.

3. The image reader as defined in claim 1, wherein said initializing means makes said focus adjusting means operate so that the image formed on said image sensor is in the infocus condition when said focus judging means judges that the image formed on said image sensor is not in the infocus condition.

4. The image reader as defined in claim 3, wherein said initializing means makes said magnification measuring means operate after the image formed on said image sensor is in the infocus condition by said focus adjusting means.

5. An image reader comprising:

an image sensor for reading an image of a document through a lens;

a variable magnification means for moving said lens so as to vary a magnification of the image formed on said image sensor;

a focus adjusting means for moving said image sensor in a direction parallel to an optical axis of said lens;

a pattern plate disposed in the vicinity of a reading area of the document, said pattern plate having a predetermined pattern comprised of plural images;

a focus judging means for judging the infocus condition of the image formed on said image sensor in accordance with the images of said pattern plate being read by said image sensor;

an error judging means for outputting an error signal when said focus judging means does not judge that the image formed on said image sensor is in the infocus condition a predetermined time after said focus adjusting means begins to operate or after said image sensor is moved by a distance larger than a predetermined distance; and a control means for stopping the operation of said focus adjusting means in accordance with the error signal.

6. The image reader as defined in claim 5, wherein said pattern plate comprises a stripe pattern in which a white line and a black line are repeatedly alternately aligned.

7. The image reader as defined in claim 6, wherein said focus adjusting means judges whether or not the image formed on said image sensor is in the infocus condition according to the difference of density levels between the white line and the black line of the stripe pattern of said pattern plate.

8. An image reader comprising:

an image sensor for reading an image of a document through a lens;

a variable magnification means for moving said lens so as to vary a magnification of the image formed on said image sensor;

a focus adjusting means for moving said image sensor in a direction parallel to an optical axis of said lens;

a pattern plate disposed in the vicinity of a reading area of the document, said pattern plate having a predetermined pattern comprised of plural images;

a focus judging means for judging the infocus condition of the image formed on said image sensor in accordance with the images of said pattern plate being read by said image sensor;

an undesirable state judging means for outputting an undesirable state signal when said focus judging means does not judge that the image formed on said image sensor is in the infocus condition a predetermined time after said focus adjusting means begins to operate or after said image sensor is moved by a distance larger than a predetermined distance;

a retry means for reversing the moving direction of said image sensor and making said focus adjustment operate again; and an error judging means for outputting an error signal when the operation number of times of said retry means is larger than a predetermined value.

9. The image reader as defined in claim 8, wherein said pattern plate comprises a stripe pattern in which a white line and a black line are repeatedly alternately aligned.

10. The image reader as defined in claim 9, wherein said focus adjusting means judges whether or not the image formed on said image sensor is in the infocus condition according to the difference of density levels between the white line and the black line of the stripe pattern of said pattern plate.

* * * * *

UNITED STATES PATENT AND TRADEMARK OFFICE
CERTIFICATE OF CORRECTION

PATENT NO. : 4,912,567

DATED : March 27, 1990

INVENTOR(S) : Akio Nakajima and Masamichi Kishi

It is certified that error appears in the above-identified patent and that said Letters Patent is hereby corrected as shown below:

In col. 2, line 60, after "time", insert --after--.

In col. 4, line 29, change "blow" to --below--.

In col. 7, line 12, change "original" to --optical--.

In col. 7, line 23, change "the a" to --is the--.

In col. 8, line 12, after "image", change "is" to --was--.

In col. 9, line 39, change "enter" to --enters--.

In col. 10, line 59, change "at well as" to --well as at--.

In col. 12, line 40, change "rotary" to --retry--.

Signed and Sealed this

Twenty-second Day of October, 1991

Attest:

HARRY F. MANBECK, JR.

*Attesting Officer*     *Commissioner of Patents and Trademarks*